Jan. 19, 1937.   A. LASZLO   2,067,970
CLUTCH MECHANISM
Filed Feb. 12, 1934   5 Sheets-Sheet 1
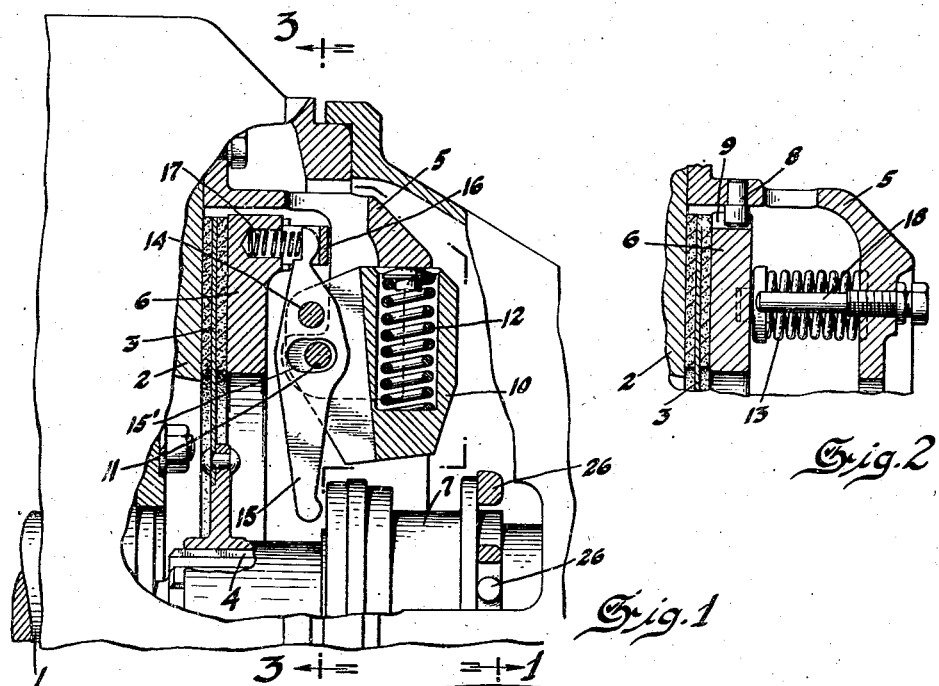
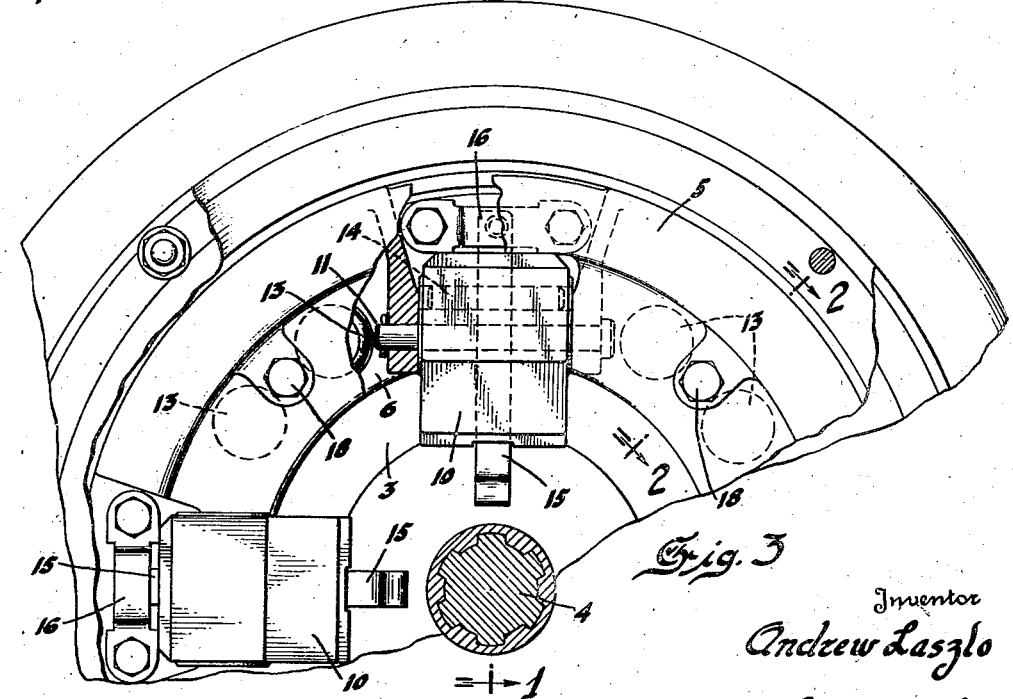
Inventor
Andrew Laszlo
By Blackmore, Spencer & Flint
Attorneys

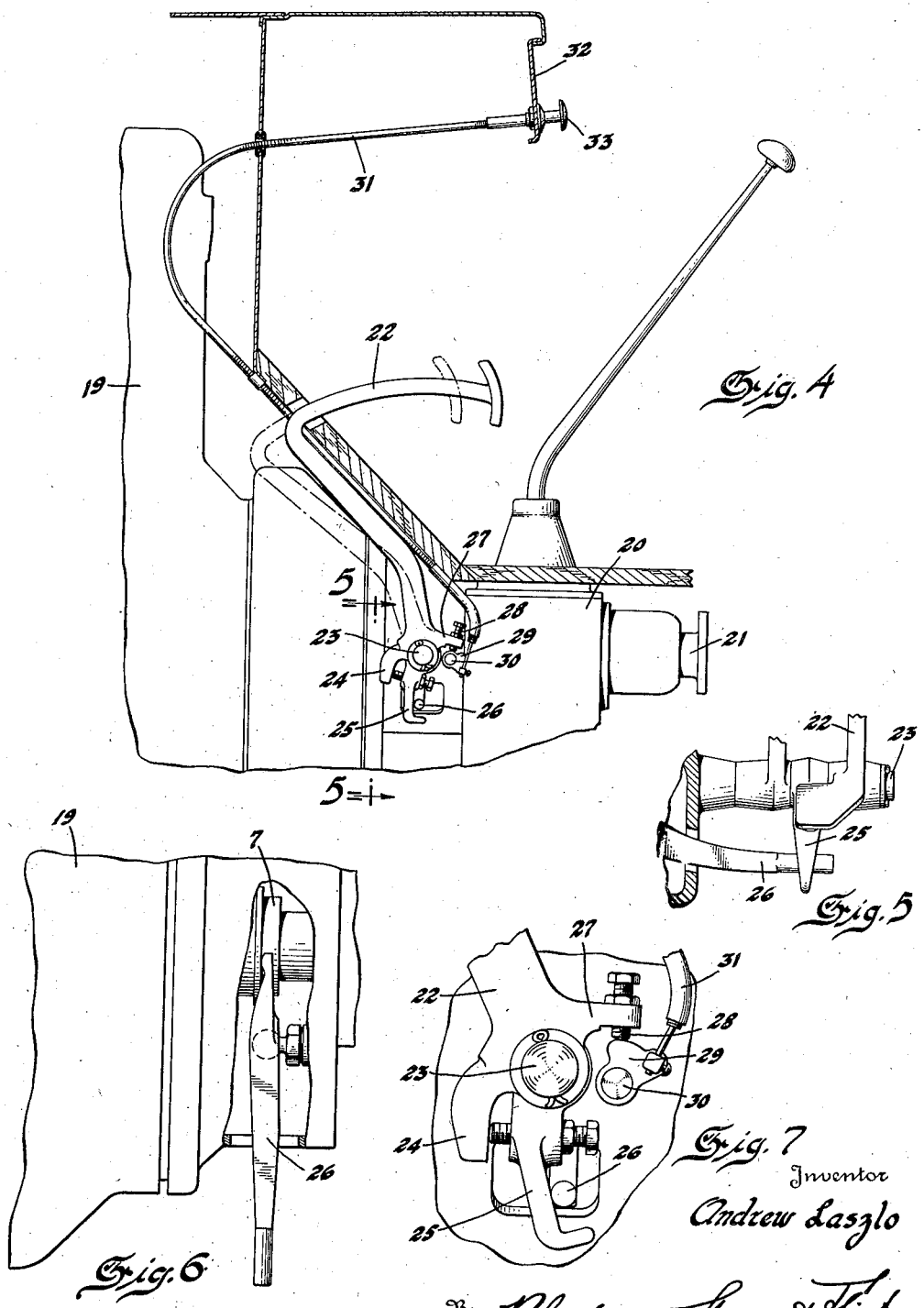

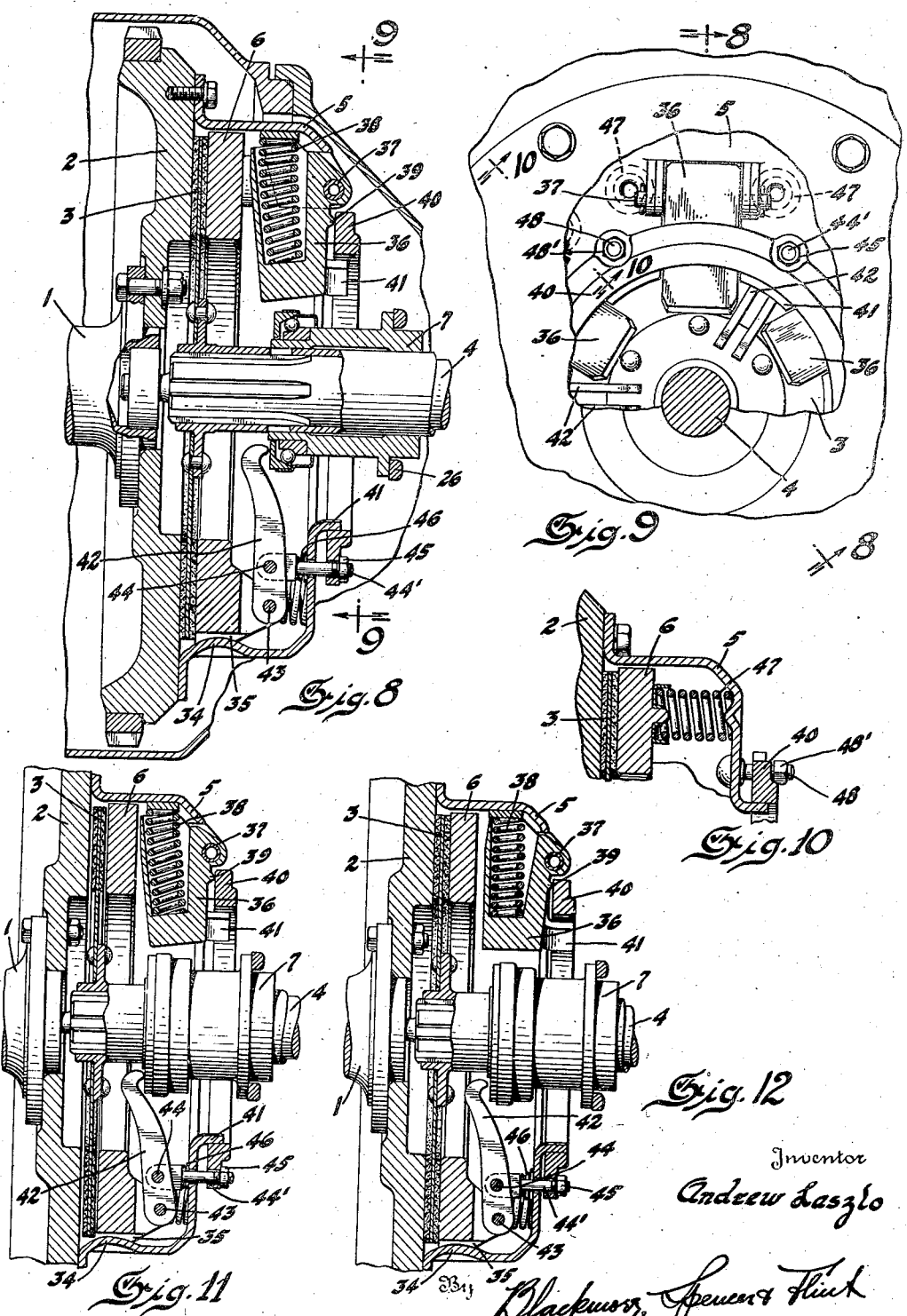

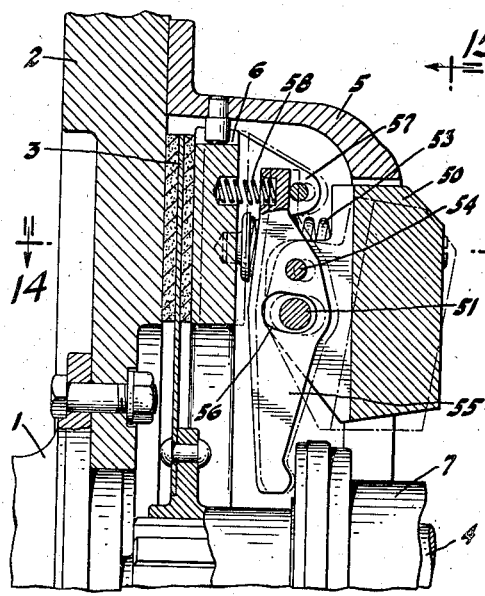
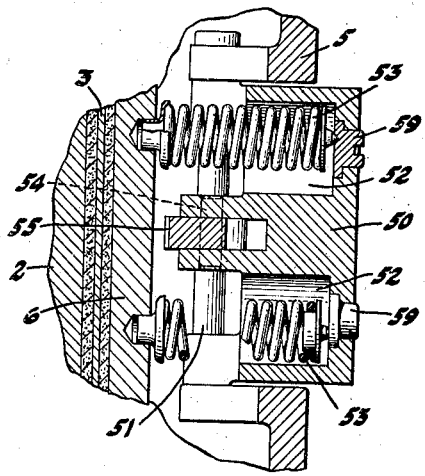
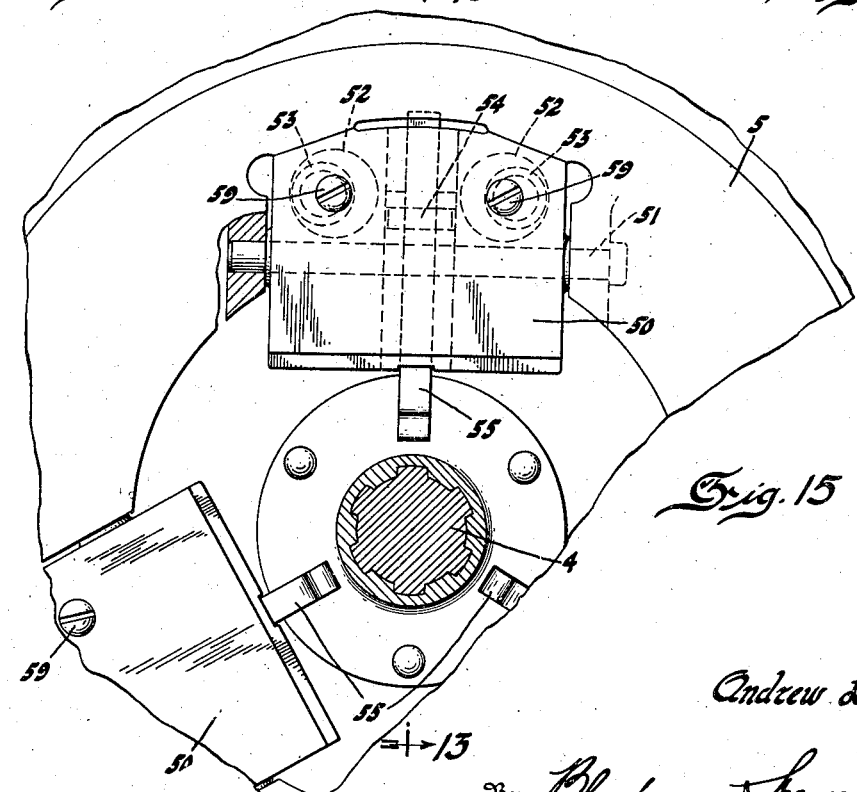

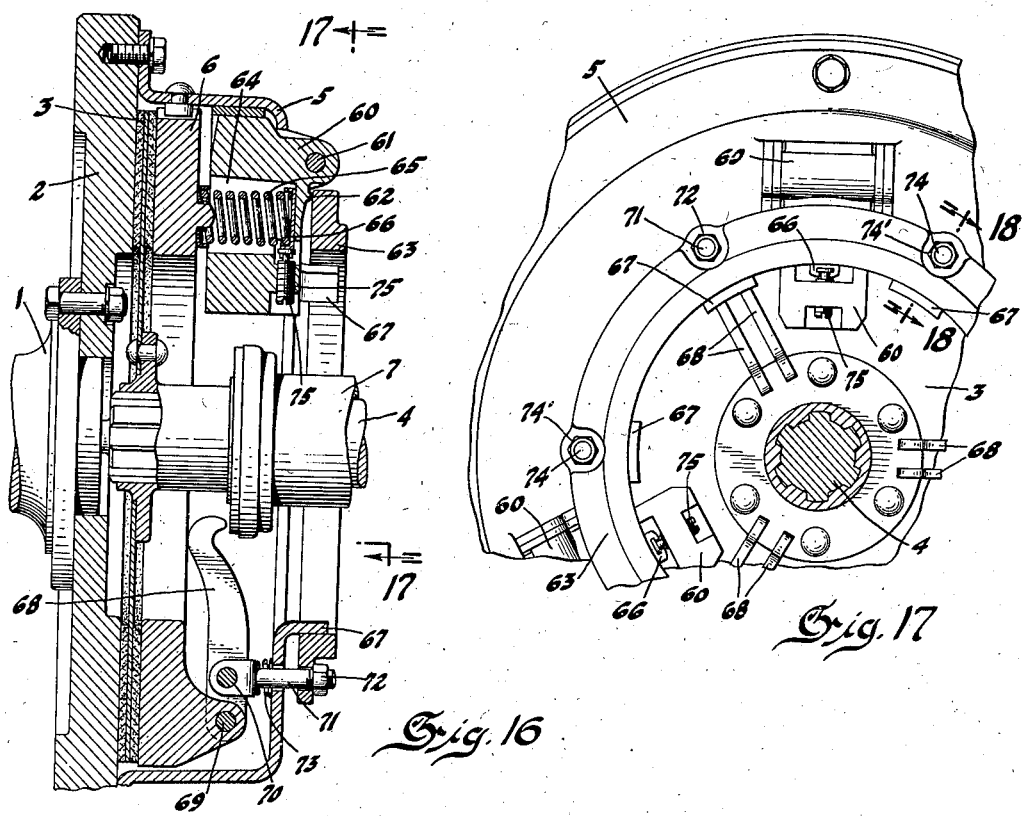
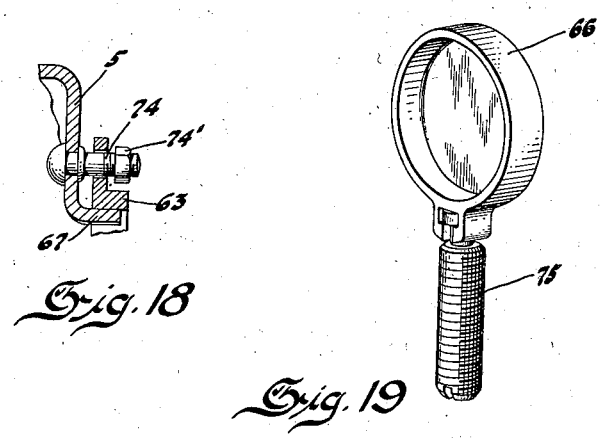

Patented Jan. 19, 1937

2,067,970

UNITED STATES PATENT OFFICE 2,067,970

CLUTCH MECHANISM

Andrew Laszlo, Detroit, Mich., assignor to General Motors Corporation, Detroit, Mich., a corporation of Delaware Application February 12, 1934, Serial No. 710,792

13 Claims. (Cl. 192—105)

This invention relates to friction clutches of the centrifugal type adapted automatically to transmit the drive from a driving shaft to a driven shaft at all driving shaft speeds in excess of a certain minimum. It relates particularly to such clutches in which provision is made whereby the clutch may be manually engaged when the centrifugal force is insufficient or not available for automatic engagement, or manually disengaged when centrifugally engaged.

One object of the invention is a centrifugal clutch of the foregoing kind in which the masses which are subject to movement under the influence of centrifugal force are effective to permit other forces to become operative to engage the clutch members, rather than of themselves providing the engaging pressure, and whereby the effort required to disengage the members is of reasonable and constant proportions and independent of the centrifugal forces which vary as the square of the speed.

Another object of the invention is to provide a centrifugal clutch in which economy of parts is obtained by combining the parts necessary for automatic operation with those required for manual operation so that each performs a dual function, being operative whether the clutch is automatically or manually operated.

Another object of the invention is to provide the clutch with a suitable control means whereby the parts may be set for either manual or automatic operation.

A further object of the invention is to provide a clutch of the foregoing character with an "equalizer ring" through which any number of centrifugal weights or masses may be operative in conjunction with any desired number of clutch levers.

A still further object of the invention is to provide a clutch in which but a single set of springs working with a differential action serves both to retract the weights and to engage the clutch.

The drawings show various designs of single disc type clutch to which centrifugal control means according to the invention has been applied, and which are suitable for use in a motor vehicle.

In every case the clutch levers through which engagement or disengagement of the friction discs is permitted or effected function as levers of the third order during centrifugal automatic operation, and as levers of the first order during manual operation. In functioning as levers of the third order, the levers move about the clutch throw-out sleeve as a fulcrum, and the fly weight retracting springs acting on the levers through the fly weights or a part movable therewith oppose or resist the engaging force of the clutch engaging springs. In functioning as levers of the first order, the levers move about the fulcrums on the fly weights or a part movable therewith, and the engaging force of the clutch engaging springs may be opposed or resisted by a force acting on the levers through the conventional clutch throw-out sleeve.

In every case also, a three positional control of the position of the clutch throw-out sleeve or an abutment for the clutch levers is provided, such that from its position for manual engagement of the clutch discs the clutch-throw-out sleeve is moved successively in the same direction to a position for automatic operation in which the clutch may be either automatically engaged or automatically disengaged, and to a position in which the clutch is manually disengaged in any circumstances.

In the drawings

Figure 1 is a part sectional view on line 1—1 of Figure 3 of a centrifugal clutch according to the invention and showing the clutch in the automatically engaged position.

Figure 2 is a detail view in section on line 2—2 of Figure 3.

Figure 3 is a view, partly broken away and partly in section, on line 3—3 of Figure 1.

Figure 4 is an external view of a centrifugal clutch according to the invention as applied to a motor vehicle, showing the manual control means for the clutch.

Figure 5 is an enlarged detail view of parts of the control means taken on line 5—5 of Figure 4.

Figure 6 is an enlarged partly broken away detail view of the shifting means for the throw-out sleeve.

Figure 7 is an enlarged detail view of the control means shown in Figure 4.

Figure 8 is a part sectional view on line 8—8 of Figure 9 of an alternative construction of centrifugal clutch according to the invention and showing the clutch in the manually engaged position.

Figure 9 is a partly broken away view approximately on line 9—9 of Figure 8.

Figure 10 is a detail view on line 10—10 of Figure 9.

Figure 11 is a view on a reduced scale of a clutch according to Figure 8 showing the parts in the automatically released position.

Figure 12 is a view on a reduced scale of a clutch according to Figure 8, showing the parts in the automatically engaged position.

Figure 13 is a part sectional view on line 13—13 of Figure 15 of another alternative construction of centrifugal clutch according to the invention, and showing the clutch in the automatically engaged position.

Figure 14 is a detail sectional view on line 14—14 of Figure 13.

Figure 15 is a view partly in section and partly broken away on line 15—15 of Figure 13.

Figure 16 is a part sectional view of another alternative construction of centrifugal clutch according to the invention and showing the clutch in the automatically engaged position.

Figure 17 is a view approximately on line 17—17 of Figure 16.

Figure 18 is a detail view on line 18—18 of Figure 17.

Figure 19 is an enlarged perspective view of a detail.

In all the drawings the driving shaft 1 is provided with the driving disc 2 which, in the examples illustrated, is an engine flywheel. 3 is the driven disc splined on the driven shaft 4. Rigidly bolted to the driving disc 2 is the clutch cover 5.

The pressure plate 6 which turns with the clutch cover 5 is capable of axial sliding movement relative thereto and is yieldingly urged towards the driven disc 3 which is frictionally gripped between the pressure plate 6 and the driving disc 2 to transmit the drive from the driving shaft 1 to the driven shaft 4.

The position of the pressure plate 6 is controlled manually by movement of the throw-out sleeve 7 into different positions axially of the driven shaft 4 or automatically by the centrifugal movement of fly weights pivoted on the clutch cover 5, and later to be described.

Both the throw-out sleeve and the fly weights are operative on the pressure plate 6 through the medium of suitable clutch throw-out levers to be described later in conjunction with the specific embodiments thereof.

Referring now to Figures 1, 2, and 3, the pressure plate 6 is driven from the driving shaft and the driving disc 2 to which the clutch cover 5 is rigidly connected, through suitable pins 8 in the clutch cover, which engage grooves 9 in the periphery of the pressure plate. An adjustable stop 18 is provided to limit the retractive movement of the pressure plate 6.

A suitable number of fly weights 10, equally spaced radially of the clutch cover 5, are pivotally mounted on pins 11 suitably supported on the clutch cover 5 in a plane at right angles to the axis of the clutch. The fly weights 10 are such that they have a centrifugal moment about the pins 11 when the driving shaft is running.

Movement of the fly weights 10 about the pins 11 under the influence of centrifugal force is yieldingly resisted by fly weight retracting springs 12 pocketed in the fly weights and reacting on the clutch cover 5.

Between the pressure plate 6 and the clutch cover 5 is another series of springs 13 which serve as main clutch springs tending to effect frictional driving engagement between the driven disc 3, the driving disc 2 and the pressure plate 6.

Pivoted on each fly weight 10 about an axis provided by a pin 14 parallel to the pin 11 is a throw-out lever 15. The lever 15 is slotted at 15' to clear the pin 11. The position of the pin 14 in each fly weight is such that a centrifugal moment tending to turn the fly weight about the pin 11 has a component of force tending to move the pin 14 to the left as shown in Figure 1, while the moment of the force of the fly weight retracting spring 12 tending to turn the fly weight about the pin 11 has a component of force tending to move the pin 14 to the right as shown in Figure 1.

Each throw-out lever 15 extends radially outwards from its pivot axis 14 into engagement with stirrups 16, one for each lever, on the pressure plate 6. The levers 15 have a half cylindrical surface in engagement with the inside of the stirrup 16 with clearance between themselves and the pressure plate 6 itself, which clearance is taken up by small springs 17. The other end of each throw-out lever 15 extends radially inwards into the path of movement of the throw-out sleeve 7.

In the position of the parts illustrated in Figure 1, centrifugal force has overcome the fly weight retracting spring 12, moving pin 14 to the left along with the throw-out lever 15 which has turned about the face of the throw-out sleeve 7, permitting the main clutch springs 13 to thrust the pressure plate and the clutch discs into frictional driving engagement.

In the automatic movement of the parts from the disengaged position to the engaged position permitted through the influence of centrifugal force, the outer ends of each throw-out lever 15 have moved about the face of the throw-out sleeve 7 as a stationary fulcrum since the turning moment of the springs 13 tending to effect engagement of the clutch as applied through the stirrups 16 on the levers 15 about the throw-out sleeve 7 has become progressively greater than the moment of the retracting springs 12 in the opposite direction about pins 11 as applied at 14 on the levers 15 about the stationary throw-out sleeve 7 reduced progressively by the centrifugal moment thereabout.

A further slight movement of the fly weights outward beyond the point where the clutch has become engaged moves the lever 15 about the yoke 16 away from the face of the throw-out sleeve 7, relieving the lever 15 of all loading.

The movement of the parts from the engaged position to the disengaged position as the speed of the driving disc becomes sufficiently low is a reversal of the above described action.

The above described operation of the parts constituting the centrifugal automatic engagement and disengagement of the clutch discs, all takes place with the throw-out sleeve 7 in the position illustrated.

It will be appreciated that at any time by moving the throw-out sleeve 7 to the left in Figure 1, the pressure plate 6 will be moved to the right away from the driven disc 3 and the clutch disengaged through the levers 15 in pivoting about 14, while if at any time the throw-out sleeve 7 is moved to the right in Figure 1, the pressure plate 6 will be moved to the left against the driven disc 3 and the clutch engaged by the springs 13 since the levers 15, having no abutment, will be incapable of preventing such engagement. This pivotal movement of the levers 15 about pin 14 takes place uninfluenced by the fly weights or their retracting springs 12.

The position of the sleeve shown in Figure 1 is that of the throw-out sleeve for automatic engagement and disengagement while the other described positions of the throw-out sleeve constitute positions taken up by the throw-out sleeve when the clutch is manually operated.

Referring now to Figures 4, 5, 6, and 7, which show the control means by which the clutch throw-out sleeve is held in the intermediate position for automatic operation of the clutch, Figure 4 shows a clutch according to the invention interposed between the engine 19 of a motor vehicle and the transmission indicated at 20. 21 is the transmission tail shaft.

The clutch pedal 22 is mounted on the clutch and brake pedal shaft 23, and has a finger 24 adjustably engaging a lever 25 through the medium of which the clutch pedal is operative to move the clutch release yoke lever 26 and thereby the throw-out sleeve 7 all in a manner which is quite conventional.

According to the invention, however, the clutch pedal 22 is provided with a lug 27 having an adjusting stop 28 thereon. The stop 28 coacts with a stepped cam 29 capable of being turned through a few degrees about a spindle 30. Turning of the cam 29 is effected through a Bowden wire control 31 from the instrument board 32 of the vehicle.

The construction and disposition of the parts is such that by depressing the clutch pedal and pulling out the Bowden wire control knob 33, the cam is moved into such a position that a "high" part of the cam holds the clutch pedal partly out. By reversing the movement of the Bowden wire a "low" part of the cam allows the clutch pedal to come into the full line position of Figure 4.

Figure 7 shows the position of the parts when the clutch pedal is in this position indicated by the broken lines in Figure 4. It will be appreciated that the broken line position of the clutch pedal in Figure 4 is that corresponding to the position of the throw-out sleeve shown in Figure 1, and coincides with a position of the throw-out sleeve intermediate between the position of the throw-out sleeve when the clutch pedal is in the position indicated in full lines in Figure 4 and a third position thereof in which the clutch pedal 22 is fully depressed.

The construction according to Figures 8, 9, 10, 11, and 12 is distinguished from the previously described embodiment in that the clutch levers are not pivoted directly on the fly weights, but on an equalizer ring in bearing engagement therewith and through which any number of fly weights may be operative in conjunction with any desired number of clutch levers.

The pressure plate 6 is driven from the clutch cover 5 through suitable indentations 34 engaging grooves 35 in the periphery of the pressure plate.

Fly weights 36, equally spaced radially of the clutch cover 5, are pivotally mounted on pins 37 suitably supported on the clutch cover 5 in a plane at right angles to the axis of the clutch. Fly weight retracting springs 38 are pocketed in the fly weights and react on the clutch cover 5.

The fly weights are each provided with a tongue 39 which bears against an equalizer ring 40. The equalizer ring is supported on a flanged part 41 of the clutch cover 5 on which it is capable of axial movement.

Bifurcated clutch throw-out levers 42, arranged radially intermediately of the fly weights 36, are pivoted on pins 43 suitably mounted on the pressure plate 6. The inner ends of the throw-out levers extend into the path of movement of the throw-out sleeve.

The throw-out levers are pivotally connected intermediately of their ends to the equalizer ring 40 through pivot pins 44 on pivot pin support members 44' extending through the clutch cover 5 and adjustably connected to the equalizer ring 40 by nuts 45. Suitable springs 46 are interposed between the pivot pin support members 44 and the clutch cover 5 to maintain the equalizer ring 40 in contact with the tongues 39 of the fly weights 36. The equalizer ring 40 is compelled to turn with the clutch cover 5 through studs 48 provided with nuts 48' and which limit the axial movement of the equalizer ring in both directions.

A series of main clutch springs 47 is provided, tending to effect frictional driving engagement between the driven disc 3, the driving disc 2 and the pressure plate 6.

Figure 8 shows the position of the parts in the manually engaged position corresponding to the full line position of the clutch pedal in Figure 4, while Figures 11 and 12 show the position of the parts corresponding to the broken line position of the clutch pedal in Figure 4, and respectively of the automatically released and the automatically engaged positions.

The operation of the parts is as follows: assuming the clutch to be in the automatically released position shown in Figure 11, then as the speed of the driving disc 2 increases, the fly weights 36 under the influence of centrifugal force turn about the pins 37, compressing the fly weight retracting springs 38. The tongue 39 is thereby moved to the left to the position shown in Figure 12, permitting the equalizer ring 40 to move to the left also, under the influence of the springs 46. This movement of the equalizer ring 40 permits movement of the pivot pin 44 to the left, permitting the levers 42 to move about the stationary clutch sleeve 7 under the influence of the clutch springs 47 which are thereby operative to effect pressure engagement of the pressure plate and the clutch discs.

It will be appreciated that to the extent that the springs 38 have a turning moment about the pins 37 greater than the centrifugal moment in an opposite direction about the pins 37, there is a force on the equalizer ring through the tongues 39 which has a turning moment on the levers 42 at 44 about the throw-out sleeve 7 which is greater than the turning moment of springs 47 on the levers 42 at 43 about the throw-out sleeve and vice versa.

Retraction of the throw-out sleeve to the right to the position shown in Figure 8 at any time permits the levers 42 to pivot about 44 and thereby to permit manual engagement of the clutch by the springs 47, while manual disengagement is effected by moving the clutch throw-out sleeve to the left against the pressure of the springs 47 acting at the outer ends of the levers 42.

The modification shown in Figures 13, 14, and 15 is similar to Figures 1, 2, and 3, except that the springs 12 and 13 of Figures 1, 2, and 3 have been replaced by a single set of springs to perform the dual function of main clutch springs and fly weight retracting springs.

In Figures 13, 14, and 15 the fly weights 50 are pivotally mounted on pins 51 suitably supported on the clutch cover 5.

Each fly weight 50 is provided radially outwards from the pin 51 with a pair of spring pockets 52 for springs 53 approximately parallel with the clutch shaft and an equal distance radially therefrom which have a seating in the bottom of the pockets with their other ends seated against the clutch pressure plate 6 which turns with the clutch cover 5 but is capable of axial sliding movement relative thereto.

Mounted on each fly weight radially outwards from the pin 51 and intermediately of the two springs is a pivot pin 54 for a clutch throw-out lever 55 which is provided with a slotted hole 56 for clearance around the pin 51.

The clutch throw-out levers extend radially inwards into the path of movement of the clutch throw-out sleeve 7 and radially outwards to engage each their own stirrup 57 on the pressure plate 6. There is a clearance between the levers 55 and the pressure plate 6 in their stirrups 57 which is taken up by small springs 58.

As shown in Figure 14, an eccentric seating for each spring 53 on a seating piece 59 in the bottom of each of the pockets 52 in the fly weights 50 is provided whereby the length of the moment arm of the springs 53 on the fly weights 50 about their pivots 51 may be changed by a turning adjustment of the seating pieces 59.

In operation the turning moment of the pressure of the springs 53 about pivot 51 results in a force at 54 on the levers 55 about the throw-out sleeve 7 which, until centrifugal force is operative, has a turning moment greater than the turning moment of the pressure of the same springs 53 through the pressure plate at 57 on the levers 55 about the throw-out sleeve 7, and the clutch is disengaged. As the fly weights are thrown outwards, there is a centrifugal turning moment opposing the turning moment of the springs 53 about 51 so that the resultant turning moment about 51 is reduced, the pressure of the springs on pressure plate 6 is increased, and the clutch is engaged.

As in the previous examples of a clutch according to the invention, retraction of the throw-out sleeve to the right at any time permits engagement of the clutch, while disengagement is effected by moving the throw-out sleeve to the left.

The modification shown in Figures 16, 17, 18, and 19 combines the use of a single set of springs to perform the dual function of main clutch springs and fly weight retracting springs as shown in Figures 13, 14, and 15 with the use of an equalizer ring for the weights and levers as shown in Figures 8, 9, 10, 11, and 12.

In Figures 16, 17, 18, and 19, the fly weights 60 are pivotally mounted on pins 61 suitably supported on the clutch cover 5. The fly weights are each provided with a tongue 62 which bears against an equalizer ring 63, and a pocket 64 for a spring 65 which has a seating 66 in the bottom of the pocket and a seating on the clutch pressure plate 6 which turns with the clutch cover 5 but is capable of axial sliding movement relative thereto.

The equalizer ring 63 is supported on a flanged part 67 of the clutch cover 5 on which it is capable of axial movement.

Bifurcated clutch throw-out levers 68 arranged radially intermediately of the fly weights 60 are pivoted on pins 69 suitably mounted on the pressure plate 6. The inner ends of the throw out levers extend into the path of movement of the throw out sleeve 7.

The throw-out levers are pivotally connected intermediately of their ends to the equalizer ring 63 through pivot pins 70 on pivot pin support members 71 extending through the clutch cover 5 and adjustably connected to the equalizer ring 63 by nuts 72.

Suitable springs 73 are interposed between the pivot pin support members 71 and the clutch cover 5 to maintain the equalizer ring 63 in contact with the tongues 62 of the fly weights 60. The equalizer ring 63 is compelled to turn with the clutch cover 5 through studs 74 provided with nuts 74' and which limit the axial movement of the equalizer ring in both directions.

The seatings 66 are flat-bottomed for movement over the bottom surface of the pockets 64 radially outwards or inwards therein through the medium of the adjusting screws 75 screwed in the fly weights and having a swivel connection with the seatings in order that the length of the moment arm of the springs 65 on the fly weights 60 about their pivots 61 may be adjustably changed.

In operation, the turning moment of the pressure of the springs 65 about pivot 61 results in a force at 62 on the equalizer ring resulting in a turning moment on the levers 68 at 70 about the throw-out sleeve 7 which, until centrifugal force is operative, has a turning moment greater than the turning moment of the pressure of the same spring 65 through the pressure plate at 69 on the levers 68 about the throw-out sleeve, and the clutch is disengaged.

As in the previous examples of a clutch according to the invention, retraction of the throw-out sleeve to the right at any time permits engagement of the clutch while disengagement is effected by moving the throw-out sleeve to the left.

I claim:

1. In a clutch mechanism, a driving member, a driven member, a pressure plate mounted to rotate with the driving member but movable into and out of engagement with the driven member to engage and disengage the clutch, resilient means tending to urge the pressure plate into driving engagement with the driven member, a clutch lever, one end thereof being in pivotal engagement with the pressure plate to control the movement thereof, a movable abutment for the other end of the clutch lever, a pivot for the clutch lever intermediate of its aforesaid ends, speed responsive means controlling the position of the pivot, said speed responsive means including a centrifugally actuated fly weight having a centrifugal moment about an axis on the driving member, the pivot being mounted on the fly weight, and manual means controlling the position of the abutment.

2. A clutch mechanism according to claim 1 in which the movement of the speed responsive means with increasing speed thereof is yieldingly resisted by resilient means separate from the resilient means tending to urge the pressure plate into driving engagement with the driven member.

3. In a clutch mechanism, a driving member, a driven member, a pressure plate mounted to rotate with the driving member but movable into and out of engagement with the driven member to engage and disengage the clutch, resilient means tending to urge the pressure plate into driving engagement with the driven member, a clutch lever, one end thereof being in pivotal engagement with the pressure plate to control the movement thereof, a movable abutment for the other end of the clutch lever, a pivot for the clutch lever intermediate of its aforesaid ends, speed responsive means controlling the position of the pivot, and stop means whereby said movable abutment may be selectively held in two different positions, in one of which the resilient means is at all times permitted to effect engagement of the clutch and in the other of which the resilient means is permitted to effect or restrained from effecting engagement of the clutch automatically in accordance with the position of the pivot controlled by the speed responsive means, said pivot being movable by the speed responsive means to a position beyond the position in which the resilient means is automatically permitted to effect the engagement of the pressure plate and the driven member, to a position in which the clutch lever is no longer abutting on its abutment, whereby the abutment is relieved of all loading when the clutch is automatically engaged.

4. In a clutch mechanism, a driving member, a driven member, a pressure plate mounted to rotate with the driving member but movable into and out of engagement with the driven member to engage and disengage the clutch, resilient means tending to urge the pressure plate into driving engagement with the driven member, a clutch lever, one end thereof being in pivotal engagement with the pressure plate to control the movement thereof, a movable abutment for the other end of the clutch lever, a pivot for the clutch lever intermediate of its aforesaid ends, speed responsive means controlling the position of the pivot, and stop means whereby said movable abutment may be selectively held in two different positions, in one of which the resilient means is at all times permitted to effect engagement of the clutch and in the other of which the resilient means is permitted to effect or restrained from effecting engagement of the clutch automatically in accordance with the position of the pivot controlled by the speed responsive means; the first said position corresponding to the manually engaged position of the clutch parts; said movable abutment in the first said position being out of contact with the clutch lever irrespective of the position of the pivot, whereby the abutment is relieved of all loading when the clutch is manually engaged.

5. In a clutch mechanism, a driving member, a driven member, a pressure plate mounted to rotate with the driving member, but movable into and out of engagement with the driven member to engage and disengage the clutch, a plurality of clutch levers to control the movement of the pressure plate, each of the clutch levers having one end in pivotal engagement with the pressure plate, a movable abutment for the other ends of the clutch levers, pivots for the clutch levers intermediate of their aforesaid ends, the last-named pivots being mounted on an equalizer ring, a plurality of speed responsive means controlling the position of the equalizer ring, and manual means controlling the position of the abutment.

6. A clutch mechanism according to claim 5 in which resilient means are provided yieldingly urging the pressure plate into engagement with the driven member, and in which the movement of the speed responsive means with increasing speed thereof is yieldingly resisted by resilient means separate from the first-named resilient means.

7. A clutch mechanism according to claim 5 in which the movable abutment is retracted away from contact with the clutch lever to engage the clutch irrespective of the position of the speed responsive means.

8. A clutch mechanism according to claim 5 in which the movable abutment is moved successively in the same direction from a position in which the clutch is at all times engaged to a second position in which the clutch may be automatically engaged and disengaged and to a third position in which the clutch is at all times disengaged.

9. In a clutch mechanism, a driving member, a driven member, a pressure plate mounted to rotate with the driving member but movable into and out of engagement with the driven member to engage and disengage the clutch, centrifugally actuated means including a fly weight having a centrifugal moment about an axis on the driving member, resilient means between the fly weight and the pressure plate tending to urge the pressure plate into driving engagement with the driven member and reacting on the fly weight with a turning moment thereon in opposition to the centrifugal moment thereon about its axis on the driving member, a clutch lever having one end in pivotal engagement with the pressure plate, a movable abutment for the other end of the clutch lever, and a pivotal connection between an intermediate part of the clutch lever and the centrifugally actuated means.

10. A clutch mechanism according to claim 9 in which means are provided whereby the length of the moment arm of the resilient means reacting on the fly weight about the pivot axis thereof may be adjustably varied.

11. A clutch mechanism according to claim 9 in which the speed responsive means includes a centrifugally actuated fly weight having a centrifugal moment about an axis on the driving member and in which the intermediate pivot for the clutch lever is mounted on the fly weight, being moved towards the driven member as the fly weight is actuated by centrifugal force.

12. A clutch mechanism according to claim 9 in which the movable abutment is retracted away from contact with the clutch lever to engage the clutch irrespective of the position of the speed responsive means.

13. A clutch mechanism according to claim 9 in which the movable abutment is moved successively in the same direction from a position in which the clutch is at all times engaged to a second position in which the clutch may be automatically engaged and disengaged and to a third position in which the clutch is at all times disengaged.

ANDREW LASZLO.